Dec. 17, 1968  M. ZIMMER  3,416,822
SYSTEM FOR COUPLING AND MUTUALLY SECURING TOGETHER TWO PARTS
Filed June 2, 1966

INVENTOR

MICHEL ZIMMER

BY Emery L. Groff

ATTORNEY

United States Patent Office 3,416,822
Patented Dec. 17, 1968

3,416,822
SYSTEM FOR COUPLING AND MUTUALLY
SECURING TOGETHER TWO PARTS
Michel Zimmer, Yverdon, Vaud, Switzerland, assignor
to Paillard S.A., Vaud, Switzerland, a corporation of
Switzerland
Filed June 2, 1966, Ser. No. 554,807
Claims priority, application Switzerland, June 23, 1965,
8,796/65
5 Claims. (Cl. 287—20.924)

ABSTRACT OF THE DISCLOSURE

A coupling means is provided for the purpose of securing one object to another such as an accessory to a camera casing. A first plate having a plurality of openings therein is attached to the camera casing whereas a second plate which includes a plurality of studs adapted to fit into said openings carries the accessory and is secured to the first plate by positioning the studs in related openings therein. Several of the studs are mounted on spring controlled levers so that the spring action normally urges the studs into locking position.

---

Various arrangements are known for the temporary coupling of two parts in a well-defined relative position; such arrangements include generally recessed and projecting sections cooperating with one another.

In arrangements of a simple structure, the accuracy of the relative position between two coupled parts is not of a very high degree whereas the arrangements provided for ensuring a perfectly accurate positioning between two parts to be coupled are expensive and furthermore their operation is neither easy nor speedy.

The present invention has for its object to ensure simply and speedily a coupling between two parts in a perfectly defined relative position. Said invention covers an arrangement for coupling and temporarily securing to each other two parts in an accurate relative position, said parts being conventionally provided with at least two studs adapted to engage corresponding slots which latter are arranged in substantial alignment with each other, at least in their coupled position. According to the invention, one of the slots is provided with parallel edges spaced by a distance equal to the diameter of the stud cooperating with said slot while the other slot is provided with converging edges forming together a V, the spacing between the edges of the said slot decreasing gradually between a value larger than the diameter of the stud and a value smaller than said diameter. A tightening mechanism is provided which urges said parts towards each other so as to shift the cooperating stud towards the bottom of the V whereas the other stud slidingly engages the other parallel-edged slot.

The accompanying diagrammatic drawing illustrates by way of example a preferred embodiment of the invention.

Figure 1:
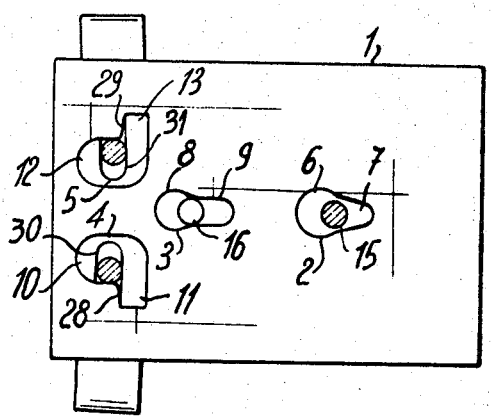
FIG. 1 is a plan view of one of the two parts to be assembled.

The first part illustrated in FIG. 1 comprises a small plate 1 provided with four openings 2, 3, 4, 5. The opening 2 is formed by a circular hole 6 opening into a V-shaped slot 7. The opening 3 is formed by a circular hole 8 opening into a slot 9 having parallel edges. The two slots 7 and 9 are located substantially in alignment with each other. The opening 4 is formed also by a hole 10 of circular general shape opening into a slot 11 extending transversely with reference to the alined slots 7 and 9. Similarly, the opening 5 is formed by a hole 12 opening into a slot 13 extending transversely with reference to said aligned slots 7 and 9.

Figure 2:
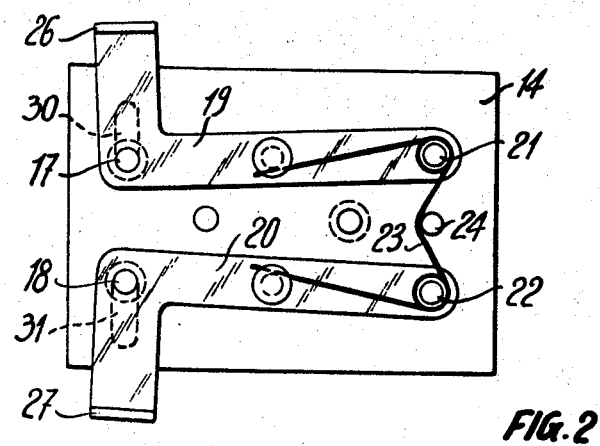
FIG. 2 is a view of the second part as seen from underneath.
Figure 3:
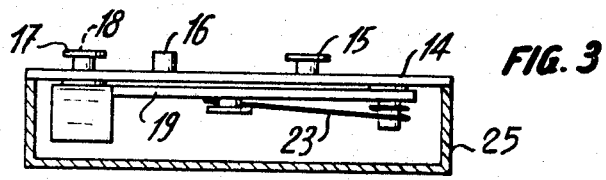
FIG. 3 is a side view of said second part with its mechanism protected by a casing shown cross-sectionally.

The small plate 1 forms one of the parts of the coupling arrangement and is adapted to be connected in a well-defined relative position with the other small plate illustrated at 14 in FIGS. 2 and 3.

Said small plate 14 carries two studs 15 and 16 rigid with it and two movable studs 17 and 18 which are secured to two levers 19 and 20 respectively. Said levers are pivotally secured to the plate 14 at 21 and 22 respectively and are subjected to the pressure of a double spring 23 of which the central section engages a stud 24 rigid with the plate 14. To either side of said central section, the spring forms a few convolutions round the pivotal axes of the levers 19 and 20, while the free ends of said spring engage auxiliary studs carried by said levers. The plate 14 is also provided with slots 30 and 31 forming transverse slide-ways in which the movable studs 17 and 18 are carried.

The above-described coupling arrangement may serve for various technical purposes and in particular it is very advantageous for securing accessories on a photographic or kinematographic camera. The accessory in question is then rigidly secured to the plate 14, the lever mechanism carried thereby being protected by a casing 25.

In order to secure the accessory on the camera, the plate 14 is brought into engagement with the plate 1 which is secured to the camera and consequently the studs 15, 16, 17, 18 enter the corresponding circular holes 6, 8, 10, 12 in the plate 1. During said movement, the levers 19 and 20 are held in a position whereby their outer ends are urged towards each other, as provided by a pressure exerted by the operator on the bent outer ends 26 and 27 of said levers. The closed position of said levers is defined by the outer ends of the slots 30 and 31 engaging the studs 17 and 18 which abut against said ends of the slots. For said closed position of the levers, the spacing between the studs 17 and 18 corresponds to the spacing between the holes 10 and 12 forming part of the openings 4 and 5.

The small plate 14 is then pushed longitudinally of the plate 1 so as to make the fixed studs 15 and 16 enter the slots 7 and 9 opening into the holes 2 and 3. This being done, the levers 19 and 20 are released by the operator, so that the studs 17 and 18 engage the transverse slots 11 and 13 forming part of the openings 4 and 5.

The direction of movement of the movable studs 17 and 18 is oblique with reference to the edges 28 and 29 of the slots 11 and 13 and consequently the pressure, exerted by said studs which are urged by the spring 23 against the shoulders formed by said edges, produces a component adapted to shift the stud 15 towards the bottom of the V formed by the slot 7 until said stud is held fast between the converging edges of said slot 7.

The angle formed between the edges 28 and 29 and the direction of movement of the movable studs 17 and 18 is small enough for a force exerted on the plate 14 in a direction urging the stud 15 out of the V-shaped slot 7, to be incapable of producing on the studs 17 and 18 a component opposing the action of the spring 23 with a force larger than the frictional force between said movable stud and said edges 28 and 29. Thus, there is no risk of the accessory being disengaged as a consequence of an accidental shock. Each of the studs 15 to 18 carries a head of a larger diameter and these heads engage the edges of the openings 2 to 5, so as to prevent the plate 14 from being shifted away from the plate 1 in a direction perpendicular to the general plane of said plate.

Numerous modifications may obviously be proposed for the arrangement described and, in particular, the studs are not necessarily grouped on the same plate. As a matter of fact, one of the plates may include a number of studs and openings adapted to cooperate respectively with openings and studs on the other plate.

In the example disclosed, the shifting of the studs 17 and 18 is performed in a direction which is substantially perpendicular to the axis of the slots 7 and 9, whereas the edges 28 and 29 of the openings 4 and 5 are oblique with reference to said perpendicular direction. The reverse arrangement may be executed as well, in which case the edges of the openings 4 and 5 are perpendicular to the axis of the slots 7 and 9 while the pivotal connection for the levers 19 and 20 is such that the shifting of the studs 17 and 18 may be performed in a direction sloping with reference to said perpendicular direction.

I claim:

1. A coupling arrangement comprising first and second parts provided with flat surfaces and adapted to engage each other through said flat surfaces, said first part being provided with two slots extending in alignment and of which one has parallel edges and the other had edges converging in V-shape at one end, two studs carried by said second part, said studs and slots being distributed on their related parts in a manner such that each stud carried by the second part engages the corresponding slot formed in the first part upon engagement between the two parts, and a fastening mechanism urging said two parts into a relative movement in a direction parallel with the general direction of the slots to clamp inside the second mentioned slot the corresponding stud, the other slot slidingly engaging its stud.

2. An arrangement as claimed in claim 1, wherein the fastening mechanism includes two auxiliary movable studs on said second part adapted to be shifted in opposite directions along a predetermined line in the cooperating surfaces of the two parts when coupled, shoulders on said first part extending along parallel lines oblique with reference to said predetermined line and cooperating with said auxiliary studs, the auxiliary studs and shoulders being distributed on their respective parts in a manner such that each auxiliary stud carried by said second part engages the corresponding shoulder formed on said first part upon engagement between said two parts, means for shifting the auxiliary studs along the corresponding shoulders whereby the engagement between the movable studs and the corresponding shoulders supplies a component force urging said other first mentioned stud towards the bottom of the corresponding shaped slot to lock said two parts together.

3. An arrangement as claimed in claim 1, wherein the fastening mechanism includes two auxiliary movable studs on said second part adapted to be shifted in opposite directions along a predetermined line in the cooperating surfaces of the two parts when coupled, shoulders on said first part extending along parallel lines oblique with said predetermined line and cooperating with said auxiliary studs, the auxiliary studs and shoulders being distributed on their respective parts in a manner such that each auxiliary stud carried by said second part engages the corresponding shoulder formed on said first part upon engagement between said two parts, a spring urging the movable auxiliary studs along the corresponding shoulders into predetermined inoperative positions, means for shifting the studs against the action of the spring along the corresponding shoulders whereby the engagement between the movable studs and the corresponding shoulders supplies a component force urging said other first mentioned stud towards the bottom of the corresponding V-shaped slot to lock said two parts together.

4. An arrangement as claimed in claim 1, wherein the fastening mechanism includes two auxiliary movable studs on said second part adapted to be shifted in opposite directions along a predetermined line in the cooperating surfaces of the two parts when coupled, shoulders on said first part extending along parallel lines oblique with reference to said predetermined line and cooperating with said auxiliary studs, the auxiliary studs and shoulders being distributed on their respective parts in a manner such that each auxiliary stud carried by said second part engages the corresponding shoulder formed on said first part upon engagement between said two parts, a spring urging the movable auxiliary stud along the corresponding shoulders into predetermined inoperative positions, levers pivotally carried by said second part, each lever carrying an auxiliary stud and including hand-operable means for shifting the levers thereby to urge the studs over the corresponding shoulders against the action of the springs into operative positions against the action of the spring along the corresponding shoulders, whereby the engagement between the movable studs and the corresponding shoulders supplies a component force urging said other first mentioned stud toward the bottom of the corresponding V-shaped slot to lock the parts together.

5. An arrangement as claimed in claim 1, wherein the fastening mechanism includes two auxiliary movable studs on said second part adapted to be shifted in opposite directions along a predetermined line in the cooperating surface of the two parts when coupled, shoulders on said first part extending along parallel lines oblique with reference to said predetermined line and cooperating with said auxiliary studs, the auxiliary studs and shoulders being distributed on their respective parts in a manner such that each auxiliary stud carried by said second part engages the corresponding shoulder formed on said first part upon engagement between said two parts, a spring urging the movable auxiliary studs over the corresponding shoulders into predetermined inoperative positions, levers pivotally carried by said second part, each lever carrying an auxiliary stud and including outer free ends adapted to be taken hold of manually and urged towards each other to shift the studs along the corresponding shoulders against the action of the spring into operative positions, whereby the engagement between the movable studs and the corresponding shoulders supplies a component force urging said other first mentioned stud towards the bottom of the corresponding V-shaped slot to lock the plates together.

References Cited

UNITED STATES PATENTS 1,052,150  2/1913  Kindl _____ 287—20.924

FOREIGN PATENTS 120,798  5/1901  Germany.

CARL W. TOMLIN, *Primary Examiner.*
RAMON S. BRITTS, *Assistant Examiner.*

U.S. Cl. X.R.

95—72